No. 771,214. Patented September 27, 1904.

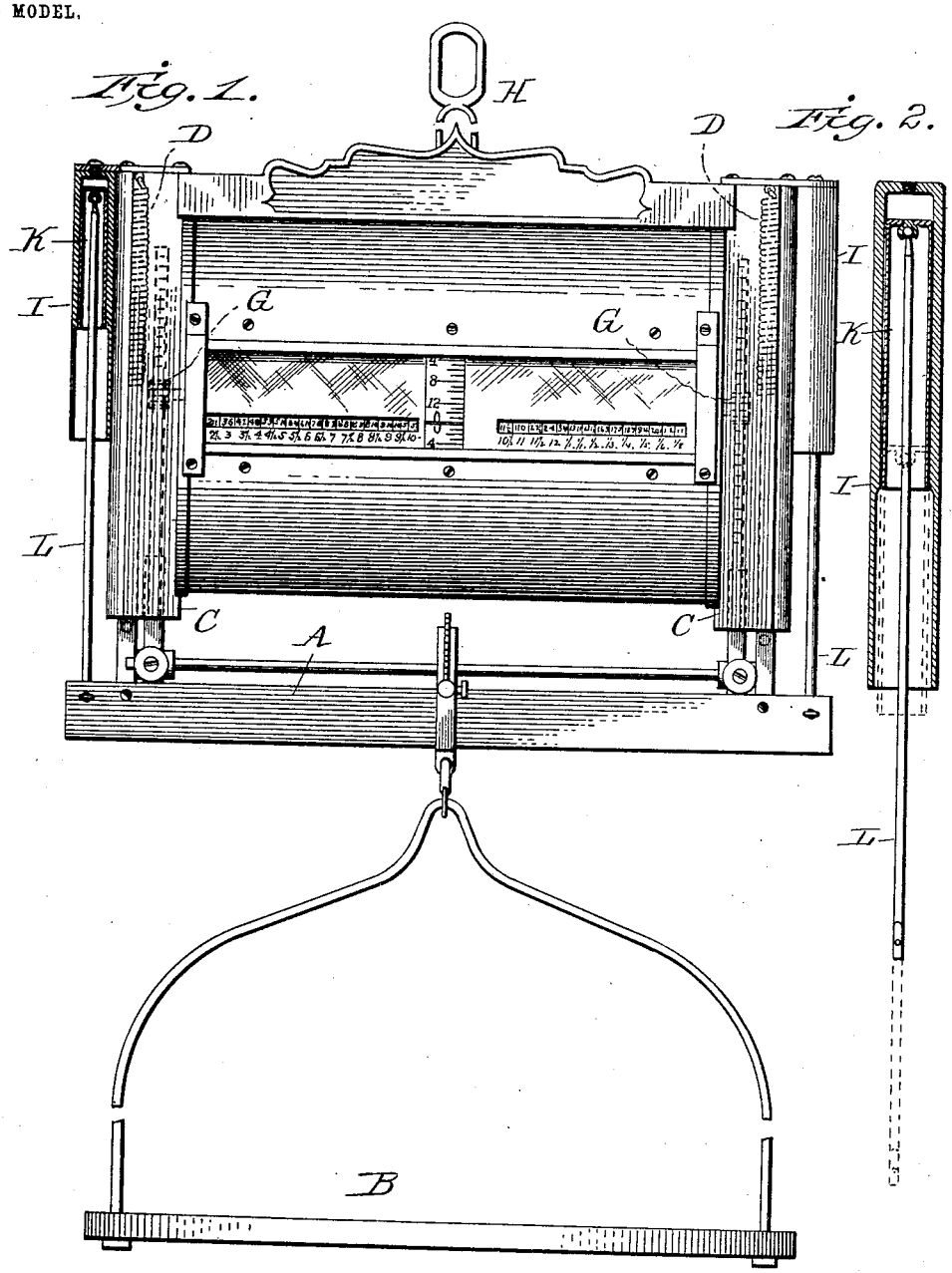

UNITED STATES PATENT OFFICE.

ALBERT U. SMITH, OF SAUGATUCK, CONNECTICUT.

SPRING-BALANCE SCALE.

SPECIFICATION forming part of Letters Patent No. 771,214, dated September 27, 1904.

Application filed May 17, 1904. Serial No. 208,423. (No model.)

*To all whom it may concern:*

Be it known that I, ALBERT U. SMITH, a citizen of the United States, residing at Saugatuck, in the county of Fairfield and State of Connecticut, have invented certain new and useful Improvements in Spring-Balance Scales; and I do hereby declare the following to be a full, clear, and exact description of the same, reference being had to the accompanying drawings, forming a part of this specification, and to the letters of reference marked thereon.

This invention relates to improvements in spring-balance scale or scales wherein the goods to be weighed are counterbalanced by suitable springs and the extension of said springs under the influence of the weight of the goods determines the movement of the weight-indicator. In such scales it is essential that the goods-support and springs shall be so mounted as to be capable of a slight transverse swing in any direction and that no extraneous influence shall operate upon the springs, support, or goods which will in any degree change the final balancing-point. At the same time it is essential that sudden or violent movements in the direction of the extension or contraction of the springs shall be counteracted and modified so as to avoid injury to the scale parts and to reduce vibration and bring the indicating mechanism and other moving parts quickly to rest. The latter characteristic makes what is known as a "quick-acting" scale or one which will give the proper indication very speedily after the goods are placed in position and without forcing the merchant to wait until the balancing parts have vibrated back and forth for an indefinite time and finally come to rest at the neutral point. Dash-pots of the pneumatic variety have usually been employed for accomplishing the ends desired; but the practical use of scales employing such dash-pots has demonstrated that under the usual conditions of use the dash-pot is liable to cause variations in the counterbalancing and indicating portions of the scale and in some instances entirely destroys the reliability of the scale as an instrument of precision. One of the chief difficulties has been due to the fact that dust cannot be excluded and will accumulate on the working surface of the dash-pot below the plunger, or in some instances insects will crawl into the dash-pot and obstruct the working of the plunger. This irregular action is especially liable to occur in movements for indicating the heavier weights, because in the ordinary working of a scale the average weights which will be indicated are light, and consequently the plunger only moves over a small portion of the working surface of the dash-pot, the whole remaining working surface of the dash-pot being thus left exposed for the accumulation of dirt or dust, which is carried into the dash-pot by the air entering the same. When a heavy weight is placed on the scale, the plunger moves onto this dirty part of the working surface, and as a result the movements of the plunger are liable to be resisted to such an extent as to destroy the accuracy of the scale. The object of the present invention is to overcome this difficulty and to provide a controller in which the entire working surface of the dash-pot and its plunger will be kept free from dirt or accumulations of any kind.

To the above ends the invention consists, primarily, in a spring-balance scale embodying a dash-pot controller and a plunger working therein having its working surface substantially coextensive with the working surface of the dash-pot.

The invention further consists in the scale such as specified having a dash-pot, as specified, and provided with a skirt or protecting-envelop for the working surface of the plunger when the latter is withdrawn to the greater or less extent from that part of the dash-pot with which it normally coöperates.

The invention further consists in certain novel details of construction, combinations, and arrangements of parts, all as will be now described, and pointed out particularly in the appended claims.

Referring to the accompanying drawings, Figure 1 is a front elevation of a scale embodying dash-pot controllers constructed in accordance with the present invention, portions of the scale-frame being broken away or omitted and one of the dash-pots being shown in section to illustrate the internal construction. Fig. 2 is an enlarged detail sectional view through one of the dash-pots and its plunger or piston, the dotted lines showing the piston withdrawn from the working part of the dash-pot to the full extent of its movement in weighing goods equal to the greatest capacity of the scale.

The scale illustrated is a typical scale of the spring-balance variety, and it will be understood that the invention may be applied to scales of this particular type or to any other particular type of spring-balance scales in which it is desired to control the movements of the weighing mechanism so as to bring them to rest quickly or to prevent breakage or distortion by the momentum or inertia of the parts. In the scale illustrated the letter A indicates a runner to which the goods-support B is attached in any preferred manner, said runner being guided by the framing C and supported by counterbalancing-springs D. A rotary drum constitutes the weight-indicator, and it is adapted to be rotated by the movement of the runner preferably through the medium of racks and pinions G. The whole scale is suspended or supported by connections with the framing, a hanger H being shown for the purpose mentioned.

The dash-pot for controlling the movements of the working parts of the scale are in this particular type two in number and located at each end of the drum. Each dash-pot consists of the cylindrical part I, suitably attached to the scale-framing and having an internal diameter very slightly larger than a plunger or piston K, adapted to work within the same and connected through a connecting-rod L with the end of the runner. Jointed connections are preferably provided between the connecting-rods and plungers or pistons and also between the connecting-rods and runner, such jointed connections being flexible or universal to permit the runner to swing in any direction. The dash-pots I throughout their working area and the plungers or pistons K are of substantially coincident length—that is to say, when the pistons are in normal position and the scale-indicator at zero the lower ends of said pistons substantially coincide with the lower ends of the working areas of the dash-pots, and consequently when any weight at all is placed on the scale the whole working surface of both of these parts comes into play, or at least the movement is over the whole of such surfaces and there is no chance for the accumulation of dust or dirt on either surface.

To protect the plunger when it is drawn down by the weight of the goods placed on the scale, the lower end of the dash-pot is extended in the form of a skirt which is of greater diameter than that of the working area or plunger or of sufficiently great diameter to prevent any contact between the two.

By providing a controller in which the dash-pot and plunger having working surfaces substantially coincident in length not only is the accumulation of dust or dirt prevented on the working surfaces, but the passage between the dash-pot and its piston or plunger is greatly elongated and the escape of air through such passage greatly retarded, the consequence being that the plunger may be made with sufficient clearness to prevent any possible irregularities due to frictional contact between the parts.

In every instance it is preferable that the pivotal connection between the plunger or piston and its rod shall be located in proximity to the upper or inner end of the piston, as by this means the canting or turning of the piston out of alinement with its connecting-rod is practically prevented, even though the piston is almost completely withdrawn from the working area of the dash-pot, as shown, for instance, by the dotted lines in Fig. 2.

Where the dash-pots are vertically arranged, as in the type of scale illustrated, this construction of piston or plunger allows it to hang pendulously from the upper end of the connecting-rod and leaves it free to center itself in the dash-pot. Thus when the scale is in operation the air expelled around the plunger or piston or drawn in around the same, as the case may be, will form a film completely around the piston, the practical result being that the piston does not contact at all with the working surface of the dash-pot, and hence the frictional resistance is, so far as practical purposes are concerned, entirely eliminated.

Having thus described my invention, what I claim as new, and desire to secure by Letters Patent, is—

1. The combination with a spring-balance scale of a controller embodying a dash-pot, the portions of the inner surface of which are of differing diameter and a plunger or piston working in said dash-pot, and of a length substantially coincident with the length of the portion of said dash-pot of least diameter; substantially as described.

2. The combination with a spring-balance scale, of a controller therefor, embodying a dash-pot open at one end, the inner end of said dash-pot being of less diameter than the outer end and a piston working in said dash-pot, the working surface of said piston being of a length substantially coincident with the length of the portion of the dash-pot of reduced diameter; substantially as described.

3. The combination with a spring-balance scale, of a controller embodying a dash-pot and a plunger or piston working in said dash-pot, the working surface of the plunger and dash-pot being of substantially coincident length and a skirt of greater diameter extending below the open end of the dash-pot; substantially as described.

ALBERT U. SMITH.

Witnesses:
RUFUS WAKEMAN,
AUSTIN WAKEMAN.